United States Patent [19]
Dybro et al.

[11] Patent Number: 5,607,118
[45] Date of Patent: Mar. 4, 1997

[54] RETRACTOR WITH ADJUSTABLE LOAD LIMITING LEVELS

[75] Inventors: Niels Dybro, Utica; Harold J. Miller, III, Troy, both of Mich.

[73] Assignee: AlliedSignal Inc., Morristown, N.J.

[21] Appl. No.: 514,288

[22] Filed: Aug. 11, 1995

[51] Int. Cl.$^6$ ..................................... B60R 22/28
[52] U.S. Cl. ........................................... 242/379.1
[58] Field of Search .................. 242/379.1; 280/805, 280/806; 297/470, 471, 472, 476, 477, 478

[56] References Cited

U.S. PATENT DOCUMENTS

| | | | |
|---|---|---|---|
| 3,927,846 | 12/1975 | Meissner | 242/379.1 |
| 4,273,361 | 6/1981 | Takei et al. | 280/805 |
| 5,431,447 | 7/1995 | Bauer | 280/805 |

Primary Examiner—John M. Jillions
Attorney, Agent, or Firm—Markell Seitzman

[57] ABSTRACT

An energy absorbing seat belt retractor comprising: a frame (22); a spool (24) rotatably mounted relative to the spool including a lock wheel (212) having a plurality of lock teeth (214) associated therewith and adapted to receive a seat belt thereabout; a lock pawl (224) for engaging the spool upon sensing a one of a vehicle deceleration and seat belt extraction above certain determinable levels; and movable nut (90) located in the spool and for prohibiting relative movement between the lock wheel and spool below a threshold input force level generated in part by occupant load on the seat belt and for generating in cooperation with a deformable bushing (100) having known deformation characteristics, the characteristics of which are controlled by a movable sleeve (242) moved about the bushing, to generate a controlled energy dissipating reaction force on the seat belt.

10 Claims, 3 Drawing Sheets

RETRACTOR WITH ADJUSTABLE LOAD LIMITING LEVELS

BACKGROUND AND SUMMARY OF THE INVENTION

The present invention relates to vehicle safety restraint products and generally to a seat belt retractor having means for absorbing (dissipating) a certain amount of energy during a crash by changing the deformation characteristics of a deformable internal part and in so doing controlling permitted occupant forward motion.

Safety belt restraint systems (or sub-systems) are designed to meet separate and distinct safety criteria and performance standards. The performance of these systems is measured in terms of known, occupant injury performance standards such as head injury criteria (HIC) and chest acceleration. It is believed that a limit of the performance of prior systems as manifested by increased occupant chest acceleration and related chest loading, is the result of an effective increased stiffness afforded by the seat belt system working independently or in concert with the air bag system. These injury criteria and the potential for actual injury can be reduced by introducing into the seat belt safety system an energy management device which absorbs, i.e. dissipates, a certain amount of the energy produced in a vehicular crash or other emergency driving condition and in so doing lessens the amount of energy imparted to the occupant lessening the injury and in so doing providing a means of controlling the displacement of the occupant.

It is an object of the present invention to provide an improved occupant protection system and more specifically an energy absorbing retractor that is fully operative prior to and during at least a first and a secondary vehicle impact. A further object of the present invention is to provide a variable energy absorbing or dissipating mechanism internal to the retractor and one which can be varied in accordance with accident parameters.

The present invention comprises: an energy absorbing seat belt retractor comprising: a frame; a spool rotatably mounted relative to the frame. including a lock wheel having a plurality of lock teeth associated therewith and adapted to receive a seat belt thereabout. The retractor additionally includes first means for engaging and stopping the rotation of the spool if vehicle deceleration or the rate increase of seat belt extraction are above certain determinable levels. Second means are located within the spool which join the lock wheel to the spool for prohibiting relative movement therebetween below a threshold input force level generated in part by occupant load on the seat belt and for generating a controlled energy dissipating reaction force on the seat belt after the input force exceeds the threshold level to permit a controlled rotation of the spool and the controlled protraction of the seat belt from the spool during at least a first and a second collision.

In the preferred embodiment of the invention the spool includes an axle assembly having a movable nut and deformable bushing interior thereto for dissipating or absorbing energy as it moves and a means for varying the deformation characteristics of the bushing to vary the amount of energy absorbed or deformed as a function of certain accident parameters.

Many other objects and purposes of the invention will be clear from the following detailed description of the drawings.

DETAILED DESCRIPTION OF THE DRAWINGS

The following generally refers to a method and apparatus for changing the stiffness characteristics of a seat belt system. The retractor, under the dynamic loading conditions generated during the crash, will generate a particular energy absorbing or constant load limiting characteristic to provide for improved occupant safety performance.

Figure 1:
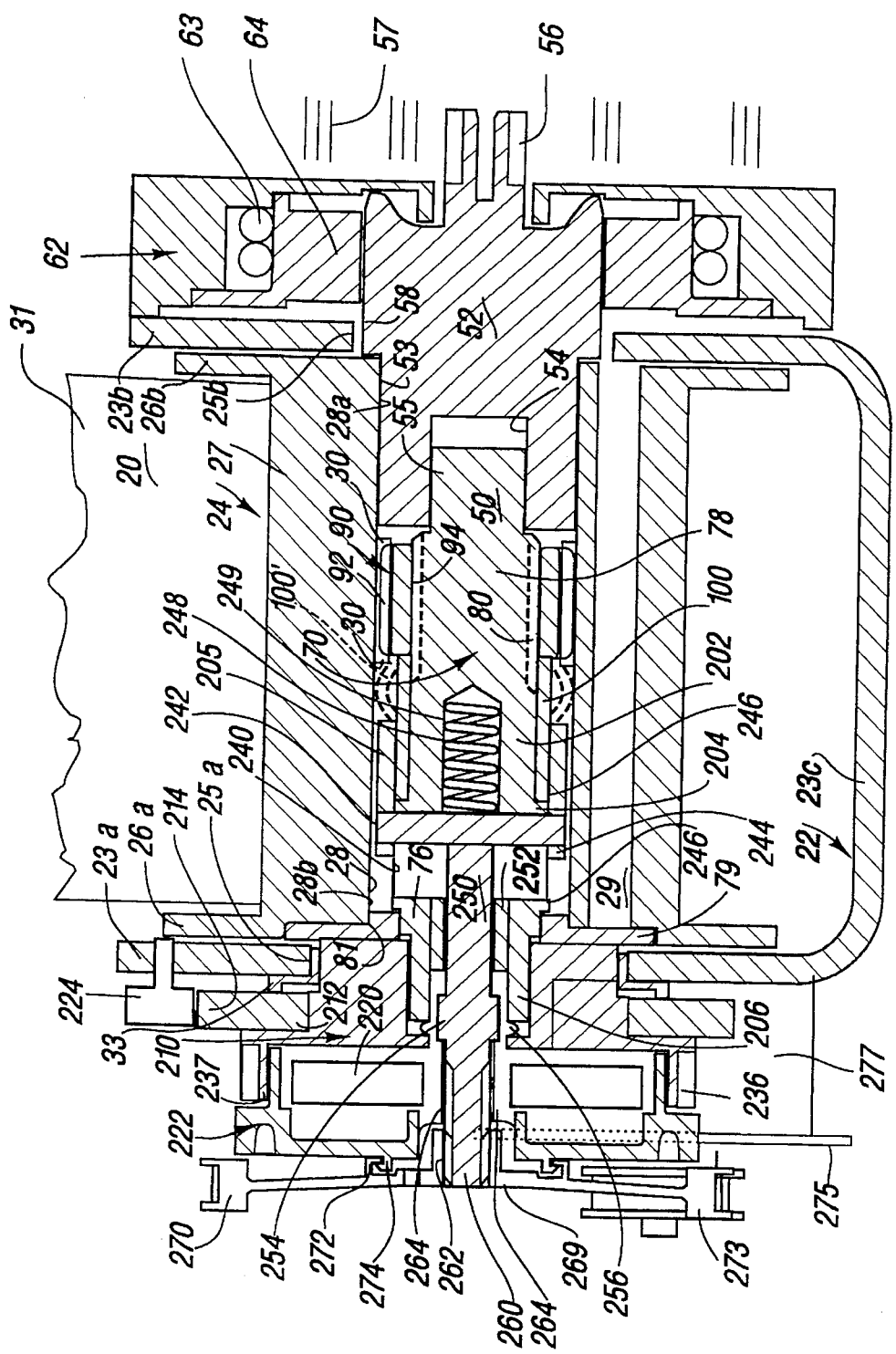
FIG. 1 illustrates a cross sectional view showing many of the major components of the present invention and shows a retractor.

Reference is made to FIG. 1 which illustrates a retractor 20 having a U-shaped frame 22 adapted to be connected to a part of a vehicle body or to a part of an occupant seat. The frame includes frame sides 23a,b having respective openings 25a and 25b and a rear or connecting part 23c. The central openings may be of different diameter as shown or the same which will depend upon how the spool is supported on the frame sides. A bushing 33 is inserted in the opening 25a. The retractor additionally includes a spool or reel 24 rotatably mounted to the frame 22. The spool includes two (2) flanges 26a and 26b, a center part 27 about which seat belt webbing 31 is wound and a center bore 28 which includes a plurality of axially directed splines, slots or keys ways 30. The center part 27 includes a slot 29 which provides a means for inserting and fastening one end of the seat belt 31 into the spool in a known manner.

Partially situated within the bore 28, is an axle assembly 50 which includes a first member 52 inserted in bore end 28a, and a second member 70 at bore end 28b. The first member 52 includes a walled portion 53 received in bore end 28a to rotationally support the spool and a hexagonal bore 54 to provide a driving, rotational engagement with a similarly shaped end 55 of the second member 70. The first member 52 includes a forked end 56 that forms a spring arbor and is adapted to receive a rewind spring 57, of known construction to retract the extended seat belt. An intermediate part 58 of the first member 52 provides an interface with a cooperating clutch 62. The clutch 62 may be a part of a pyrotechnic pretensioner (or belt tightener) mechanism which when activated propels a piston down a tube (not shown) to pull on a wire cable 63 causing clutch shoes 64 to engage member 52 to forcibly rewind and reduce unneeded slack in the belt (torso or lap) connected to the retractor 20. The operation of this type of pretensioner and clutch is known in the art and need not be discussed in any detail. As can be seen the clutch 62 supports the right hand end of the axle assembly 50 and provides a bearing surface upon which the intermediate portion 58 of the axle assembly 50 rotates.

Figure 3:
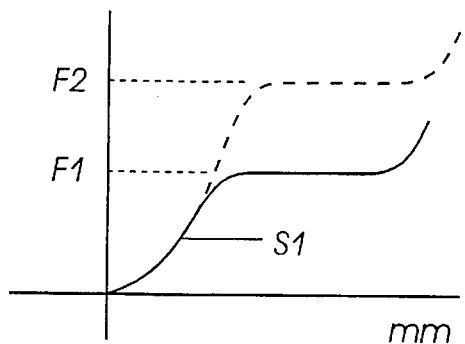
FIG. 3 shows an isolated view of a portion of an axle assembly.
Figure 5:
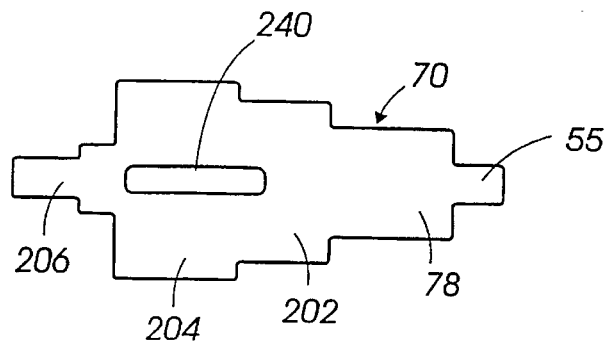
FIG. 5 shows a partial cross-sectional view of a retractor in one of its modes of operation.

As can be seen from FIGS. 1 and 3 the second member 70 is a long bolt-like member. As mentioned above the right end 55 of the second member 70 is hexagonally shaped to provide a driving connection with the hexagonal bore 54. The second member includes a narrowed portion 78 having a plurality of threads 80. A carrier member such as a threaded nut generally shown as 90 interposes the narrowed portion 78 and the spool. The inside surface of the nut includes threads 94 which matingly engage threads of the narrowed portion 78. This nut, on its outer surface, includes a plurality of splines 92 which permit the nut to slide axially along cooperating splines 30 of the spool as the nut rotates on the threads 80. As can be appreciated the threads can be on the spool and the splines on the narrow portion 78. The second member 70 includes a part 76 axially secured in place by a retainer or stop member 79 which also rotationally supports the left hand end of the spool 24 on a shoulder 81.

Figure 4:
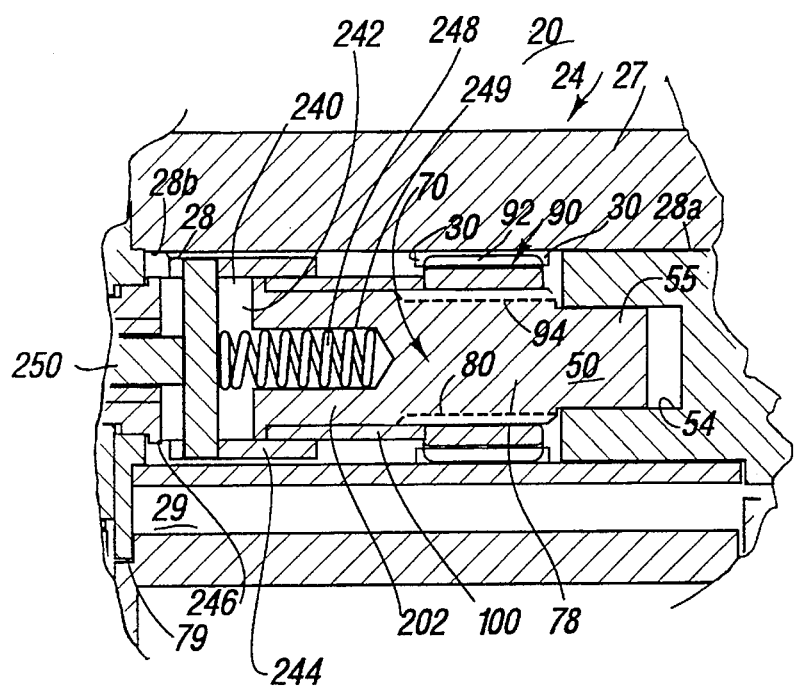
FIG. 4 illustrates a force versus belt extension curve showing the belt force exerted on the occupant.

The second member 70 additionally includes a wider diameter portion 202 which terminates at a larger diameter end portion 204 part of which forms a shoulder 205. Loosely received about the middle portion 202 is a deformable bushing 100 positioned between the shoulder 205 and nut 90. The end portion 206 of the second member supports a lock gear or wheel assembly 210 having a lock wheel 212 with a plurality of locking teeth 214. The lock wheel assembly 210 further includes a web sensor 220, shown diagrammatically nestled within a ratchet wheel 237, a rotatably mounted lock cup 222 and a rotatably mounted locking pawl 224, a vehicle sensor 230 (see FIGURE 4) comprising a sensor pawl 232 and an inertia mass 234 such as a standing man. Upon movement of the inertia mass 234, the sensor pawl 232 is moved into engagement with ratchet teeth 236 formed on the ratchet wheel 237. Lock wheel assemblies such as 210, including the web sensor 220, inertia sensor 230, lock pawl 224 and sensor pawl 234 and lock cup 222, are more specifically illustrated in European patent document EP 0 228 729 A1 which is incorporated herein by reference. When either of the vehicle or web sensors are activated they cause the lock pawl 224 to move into engagement with the teeth 214 of the lock wheel 212.

As can be seen from FIGS. 1 and 3, the second member 70 of the axle assembly 50 includes an oval or elongated slot 240. Slidably received within the slot 240 is a pin 242. The pin 242 is received within and moves a sleeve 244 that is slidably received about the exterior 246 of the second member 70 and also about the bushing 100. The pin 242 is biased outwardly, that is to the left, by a spring 248 received within a bore 249 of the member 70. The pin 242 is moved inwardly by a shaft 250 that is rotationally supported near one end by an extension 252 of the lock cup 222. The shaft 250 includes an enlarged projection 254 that is situated in a slot in the extension of the lock cup 222 providing for anti-rotation of the shaft 250. The extension of the lock cup 222 has an annular projecting ring 256, that is urged into a space between the end portion 206 of the second member 70 and a portion of the ratchet wheel 237 by the insertion of shaft 250 during assembly and keeps it in position. The left hand end 260 of the shaft 250 includes a plurality of threads 262 that are received within mating threads 264 formed on a middle portion 264 of the lock cup 222.

The pulley 270 includes a plurality of fingers 272 (only one of which is shown) which matingly engage a complementary set of fingers 274 extending from the lock cup 222. In this manner the pulley is axially fixed but rotatable relative to the lock cup 222.

Figure 2:
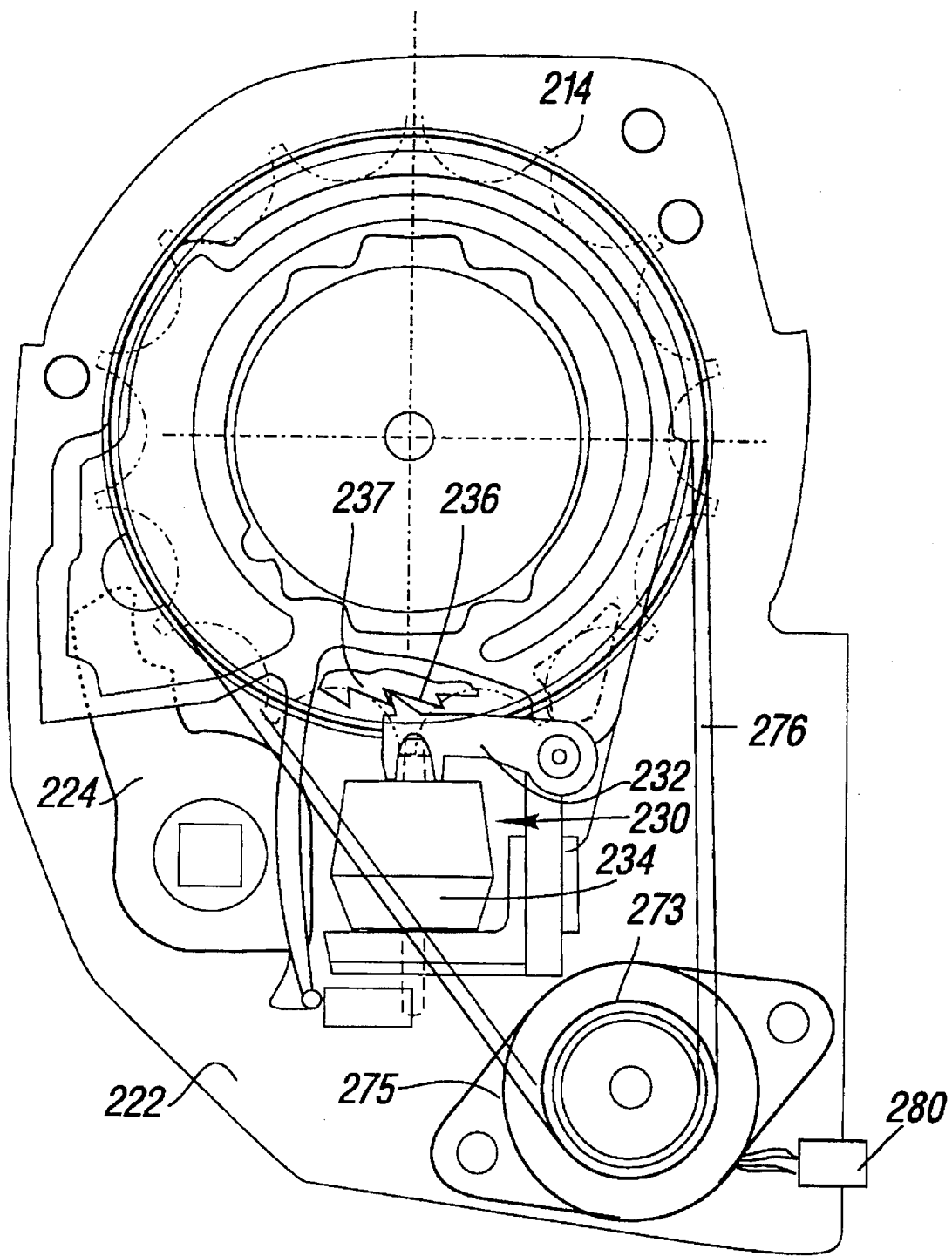
FIG. 2 illustrates a left hand, side view along section line 2—2 of FIG. 1.

Reference is again made to FIGS. 1 and 2. An electric motor generally shown as 273 having a flanged mounting surface 275 is mounted to the frame 22 of the retractor by a support 277. A timing drive belt 276 (not shown in FIG. 1) drivingly links the pulley 270 with the motor 273 typically via a tooth interface on the belt or on the motor and pulley.

During an accident the pretensioner (not shown) is activated typically propelling a piston (not shown) down a tube pulling the cable 64 to activate the clutch 62. Such activation causes the clutch shoe 64 to engage the first member 52 of the axle assembly, thereby reverse rotating this member 52. The motion of member 52 is communicated to the second member 70 reverse rotating the spool through the interconnection between the second member 70, nut 90 and spool 24. Thereafter or simultaneously with the operation of the pretensioner the teeth 214 of the lock wheel 210 become engaged in response to the motion of the web sensor or vehicle sensor.

Thereafter because of the dynamics created in a crash the occupant is biased to move forward generating a substantial force upon the belt system that is connected to the spool. This force is transmitted via the seat belt webbing wound about the center part 27 of the spool 24 creating a torque tending to rotate the spool, in a belt unwinding direction. The tendency of the spool to rotate is controlled by the reaction forces generated at the interfaces between the nut 90 and the spool 24, the nut and the second member and the lock wheel 210 and the lock pawl 224. The loads (or torques) imparted to the spool are transmitted directly to the threads 80 which tends to cause the nut 90 to try to rotate to the left about the threads 80 as viewed in FIG. 1 and simultaneously slide along the splines 30. This motion is initially impeded by the bushing 100 which is loaded between the stop member 79 and end portion 204 of the second member 70. At some level of belt force, with the sleeve 244 in a given position, the torsional forces developed at the thread 80/94 interface will be sufficient to cause the bushing 100 to deform. Once this force level is reached the nut 90 will continue to rotate and slide compressing or deforming the bushing. As can be appreciated as the spool rotates, seat belt webbing is permitted to protract under the pulling force exerted by the occupant on the seat belt. The pulling force is limited by the reaction force capability of the shaft assembly 50. This generated reaction force is primarily defined by the mechanical characteristics of the bushing 100. If the amount of slack, i.e. protracted webbing, introduced into the seat belt is not controlled the occupant may be subjected to increased HIC and chest loading. The control of the occupant's motion is obtained by generating a substantially constant reaction force against the belt. This reaction force is generated as the bushing is deformed as it is compressed by the nut 90.

As the bushing 100 is compressed (see S1 of FIG. 3) the reactive force is defined generally by the yield strength of the bushing. Further rotation of the spool and movement of the nut compresses the bushing to its yield strength limit and generates through the nut the constant reaction force or torque on the spool which in turn generates a constant reaction force F1 (see FIG. 3) on the belt. The dimensions of the outer bore 28 and the length and material of the bushing 100 are chosen to achieve a generally constant reaction force during the primary accident which is approximately in the range of 400–2000 lbs. (1780–8900 Newtons). As an example it has been found that during a typical accident the occupant might cause the amount of about 20 cm (8 inches) of webbing to be protracted from the retractor. This amount of protraction can be equated to deformation of the bushing. As such the bushing length and the thread pitch of threads 80 and 94 can be chosen to permit the nut 90 to be able to move the anticipated distance to the left. Depending upon the crash characteristics the desired reactive load generated in the retractor can be in the range of 400 lbs. to 2000 lbs. (1780–8900 Newtons). The horizontal axis of FIG.

3 is shown in millimeters (or inches) of cumulative seat belt extension measured after a pretensioner, if used, has rewound the seat belt about the spool for a first crash.

The present invention provides a means for effectively changing the mechanical characteristics of the bushing so that the energy absorbing characteristics of the retractor can be tailored to the specific occupant and crash conditions. As can further be appreciated, the amount of compressive load needed to deform the bushing, such as 100, depends amongst other things (such as material choice, thickness) on its length.

Consider, for example, the operation of the retractor 20 as illustrated in FIG. 1 with the pin 240 and sleeve 244 in their right most position. The effective stiffness of the bushing 100 is substantially increased compared to the operational mode when the sleeve 244 is moved to the left covering less of the bushing 100. As such, in the position illustrated in FIG. 1 it will take a larger amount of energy to cause the bushing 100 to deform. Such deformed condition is illustrated by phantom line 100. Consequently, the reactive force generated by the retractor 20 with the sleeve 244 in this position will be for example at a level such as F2 (see FIG. 3). With the sleeve 244 moved to the position shown in FIG. 4 the exposed length of the bushing 100 is increased as compared to that shown in FIG. 1 wherein the amount of energy needed to deform the bushing is reduced compared to the rightward positioning of the sleeve 244.

In view of the above it can be seen that the present invention provides a means for varying the reactive force generated by the retractor 20 and in so doing controlling the permitted forward motion of the occupant during an accident. Prior to installation of the retractor 20 it will be tested with the sleeve 244 moved to various positions relative to the bushing 100 such that a relationship can be developed between the reactive force level and the position of the sleeve 244 relative to the bushing. Additionally, the amount of permitted reactive force to be generated can be predetermined by certain accident parameters.

By an accident parameter it is meant a parameter that is useful in ascertaining the intensity of a crash or the level of reactive force that needs to be generated during a crash energy. Such parameters include vehicle mass, vehicle stiffness, vehicle closing speed relative to an object and/or simply vehicle speed. Additionally, these accident parameters include parameters specific to the occupant to be protected. Additional accident parameters would include occupant mass and size, seating position relative to the steering wheel or instrument panel, etc.

Once having sensed, monitored, or predicted the crash conditions, the system generally will be able to determine the level of reactive force that should be generated to protect the occupant. As an example, vehicle road speed or the closing speed with a barrier or another vehicle parameters can readily be obtained from a wheel speed sensor of an anti-lock braking system and closing speed can be obtained from known radar or vehicle position detection systems (closing speed being the derivative of position). The general size of an occupant can be obtained by many means. Some indirect ways of determining occupant size (and implicitly his or her weight or mass) include measuring the height of the D-ring or web guide (that supports) the shoulder belt (a measurement of upper torso size) or by monitoring seat position (lower torso size). Seat position and seat back angle also provide an understanding of how close an occupant might be to the steering wheel or dash board and a measure of the limit to how much travel forward is permitted. As an example, if an occupant is of a small size it might be advantageous to generate a lower level constant reactive force as compared to the desired force needed to control a larger occupant. As can be appreciated over a given period of time if a higher reactive force acts on the seat belt in comparison to a smaller force the amount of webbing permitted to protract from the spool is less. With a small sized occupant who is seated close to the steering wheel or instrument panel, the system would generate a higher reactive force to reduce the permitted amount of occupant motion in comparison to a situation in which the occupant is seated away from the steering wheel or instrument panel. As can be appreciated if the occupant is seated further away from a barrier, i.e. a steering wheel or instrument panel, the retractor or system can permit the controlled amount of occupant travel to be greater (the amount of travel is controlled by the level of reactive force generated). An example of directly measuring occupant size might include ultra-sonic or microwave distance monitoring devices or pattern recognition devices.

Having determined the desirable reactive force level an electronic control unit 280 having stored therein the above mentioned relationship between sleeve position and reactive force level may communicate a control signal to the motor 273 causing the pulley 270 to rotate. The rotation of the pulley causes the shaft 250 to move inwardly or outwardly to its desired force generating position exposing a predetermined amount of the bushing 100 thereby controlling the deformation characteristics of the bushing 100 so that a determinable reaction force in opposition to occupant developed belt loads can be generated. The method of positioning the sleeve 244 can be accomplished in many ways. As an example, during engine start up the motor 273 can rotate the sleeve to its rightmost position corresponding to the highest constant force generating potential. Thereafter the motor may move the shaft 250 and sleeve 244 to its determinable position. Position of the shaft can be determined by counting the number of revolutions of the motor or incorporating electronic position feedback techniques to sense shaft position directly.

Many changes and modifications in the above described embodiment of the invention can, of course, be carried out without departing from the scope thereof. One such modification is to replace the timing belt with a timing gear so that the pulley is directly coupled to the motor. Accordingly, that scope is intended to be limited only by the scope of the appended claims.

We claim:

1. A seat belt retractor (20) for protecting an occupant during a vehicle impact comprising:

a rotating spool or real (24), seat belt webbing (31) wound about the spool and adapted to extend about the occupant;

first locking means (210, 237, 230, 2201) operatively connected to the spool for initially preventing the rotation of the spool, first means (90, 100) associated with the spool and operable after the spool has been locked, for enabling the spool to rotate so that the webbing can be removed therefrom, after a predetermined load, in excess of a first level, has been applied to the belt webbing, and for generating a determinable reaction force level on the belt opposing occupant motion;

second means (270, 273, 275, 250) for actively varying the reactive force level.

2. The device as defined in claim 1 wherein the first means comprising:

a first bore (20) in the retractor, an axle assembly (50), having first (90) and second (70) axle parts received in the bore, means for advancing at least the first axle part in the bore and for causing a portion (100) of the reel to be deformed in response to the advancing motion of the first axle part (90).

3. A seat belt retractor (20) for protecting an occupant during a vehicle impact comprising:

a rotating spool or reel (24), seat belt webbing (31) wound about the spool and adapted to extend about the occupant;

first locking means (210, 237, 230, 2201) operatively connected to the spool for initially preventing the rotation of the spool, first means (90, 100) associated with the spool, for enabling the spool to rotate after a predetermined load, in excess of a first level, has been applied to the belt webbing, and for generating a determinable reaction force level on the belt opposing occupant motion, the first means including a deformable portion;

second means (270, 273, 275, 250) for causing the reactive force level to vary, including a sleeve (242) received about the deformable portion (100) to change the deformation characteristics of the deformable portion.

4. The device as defined in claim 3 wherein the deformable portion (100) is a bushing.

5. The device as defined in claim 3 wherein the second means includes third means (273, 270) for moving the sleeve (242) along the exterior of the bushing (100) to control the exposed surface area thereof.

6. The device as defined in claim 5 wherein the third means includes a movable sleeve (250) linked to the shaft.

7. The device as defined in claim 6 wherein the third means further includes a motor driven pulley (270) for rotating the shaft (250) with a threaded part of the retractor to axially move the shaft and hence the sleeve (242).

8. A method of absorbing energy using a seat belt retractor, the retractor including a deformable member (100) and an axially movable part (90) to deform the deformable member, and a movable sleeve (242) received relative to the deformable member, the method comprising the steps of:

providing in the retractor a crushable member (100) fitted in the reel of the retractor, and an axially movable part (90) for crushing the member, loading a reel of the retractor to cause the reel to rotate relative to the part causing the part to move axially into the member to deform same, varying the deformation characteristic of the deformable part by adjustably covering a portion thereof in accordance with an accident parameter to a predetermined level during an accident.

9. A seat belt retractor (20) for protecting an occupant during a vehicle impact comprising:

a rotating spool or reel (24), seat belt webbing (31) wound about the spool and adapted to extend about the occupant;

first locking means (210, 237, 230, 2201) operatively connected to the spool for initially preventing the rotation of the spool, first means (90, 100), including a deformable member (100) the deformation characteristic of which is related to an exposed length of the deformable member, for enabling the spool to rotate after a predetermined load, in excess of a first level, has been applied to the belt webbing, and for generating a determinable reaction force level on the belt opposing occupant motion;

second means (270, 273, 275, 250) movable relative to the deformable member (100) for varying the reactive force level by controlling the deformation characteristic of the deformable member.

10. The device as defined in claim 9 wherein the second means includes a sliding sleeve, movable relative to the deformable member, to control the exposed length of the deformable member.

* * * * *